United States Patent [19]

Bains et al.

[11] Patent Number: 5,678,009
[45] Date of Patent: Oct. 14, 1997

[54] METHOD AND APPARATUS PROVIDING FAST ACCESS TO A SHARED RESOURCE ON A COMPUTER BUS

[75] Inventors: Kuljit S. Bains, Folsom; Kenneth M. Crocker, Orangevale; David E. Freker, Folsom, all of Calif.

[73] Assignee: Intel Corporation, Santa Clara, Calif.

[21] Appl. No.: 599,921

[22] Filed: Feb. 12, 1996

[51] Int. Cl.⁶ .................................................. G06F 13/38
[52] U.S. Cl. ............................................................ 395/305
[58] Field of Search ................................. 395/280, 287, 395/289, 290, 305, 306, 474, 477, 475, 494, 299

[56] References Cited

U.S. PATENT DOCUMENTS

| | | | |
|---|---|---|---|
| 5,448,703 | 9/1995 | Amini et al. | 395/494 |
| 5,517,626 | 5/1996 | Archer et al. | 395/445 |

Primary Examiner—David L. Robertson
Attorney, Agent, or Firm—Blakely, Sokoloff, Taylor & Zafman

[57] ABSTRACT

A method and apparatus for transferring control of a memory bus, providing access to a memory array, from a controller having control of the memory bus to a controller desiring control of the memory bus are described. The method requires generating an access request directed to the controller having control from the controller desiring control, which is then detected by the controller desiring control. A determination is made as to whether the memory bus is being used, by the controller having control, by sampling the row address strobe (#RAS) line. A fast bus transfer sequence is initiated if the memory bus is not in use, the fast transfer sequence transferring control of the memory bus to the controller desiring control after a first time period. Alternatively, a slow bus transfer sequence is initiated, when the memory bus use is over, if the memory bus is in use. The slow transfer sequence transfers control to the controller desiring control after a second time period, which is longer than the first time period and which includes a precharge period not included in the first time period. Thus when the fast transfer sequence is performed, unnecessary precharging of memory selection circuitry is avoided.

24 Claims, 4 Drawing Sheets

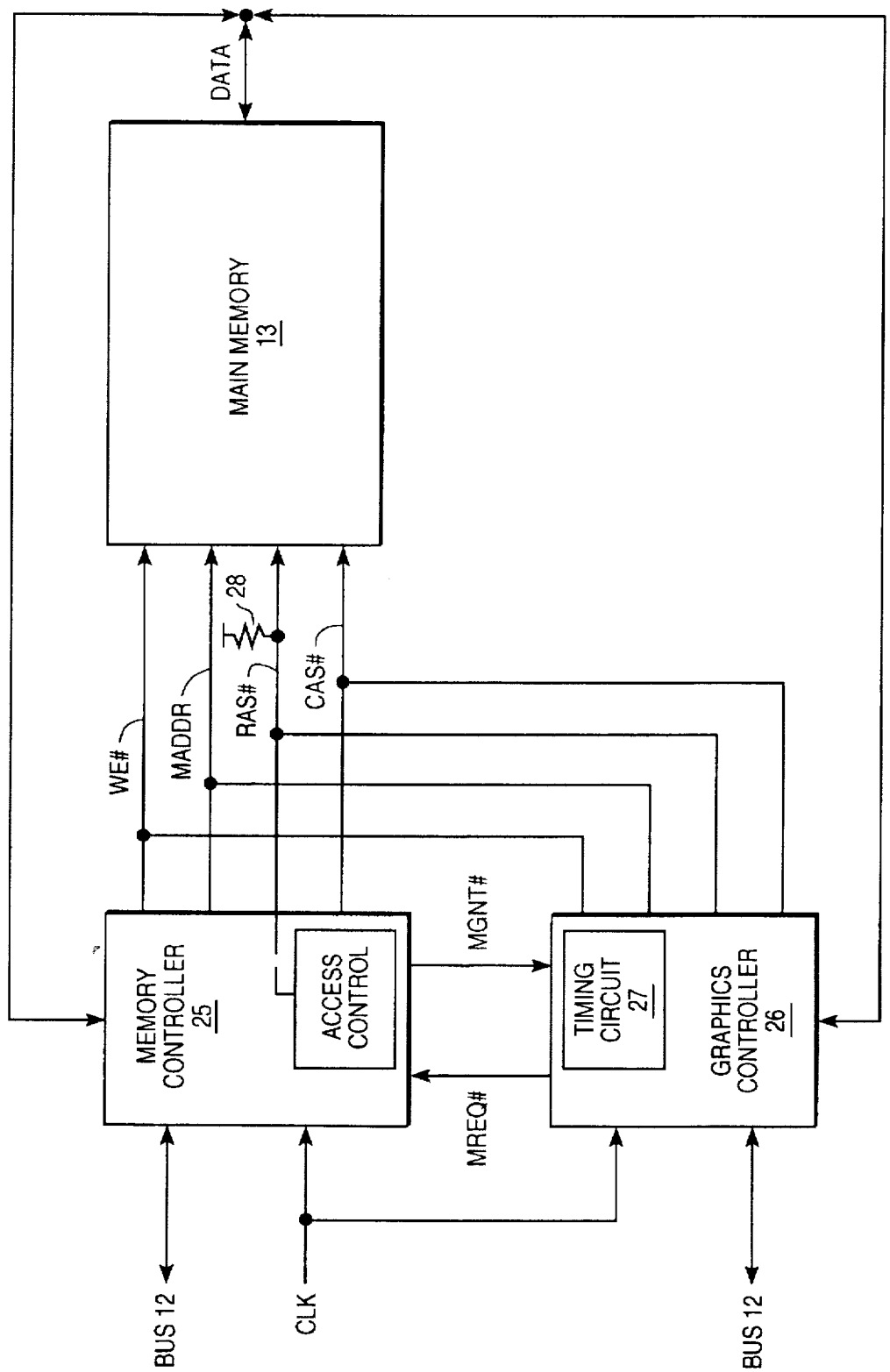
FIG._3

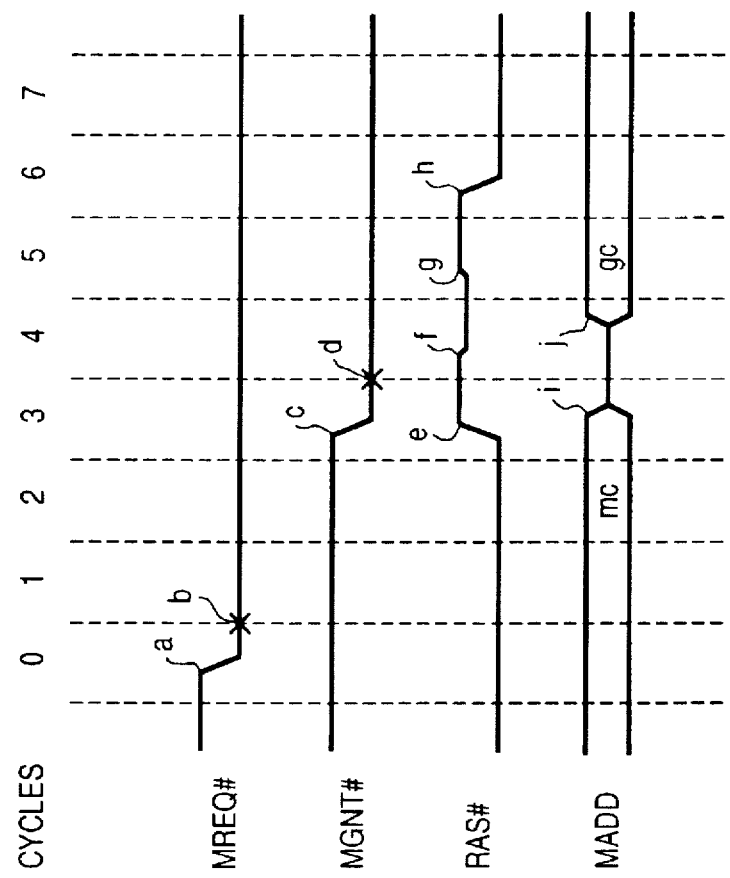
FIG_5
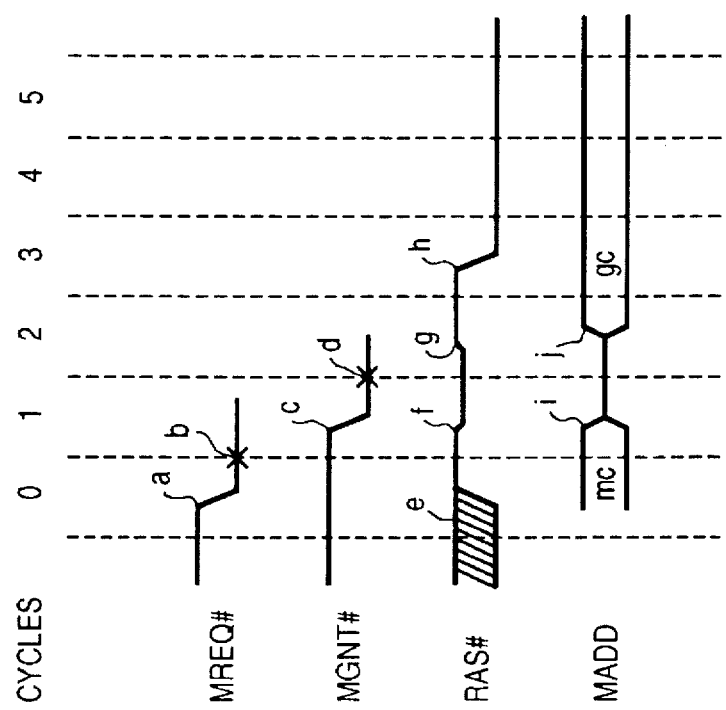
FIG_4

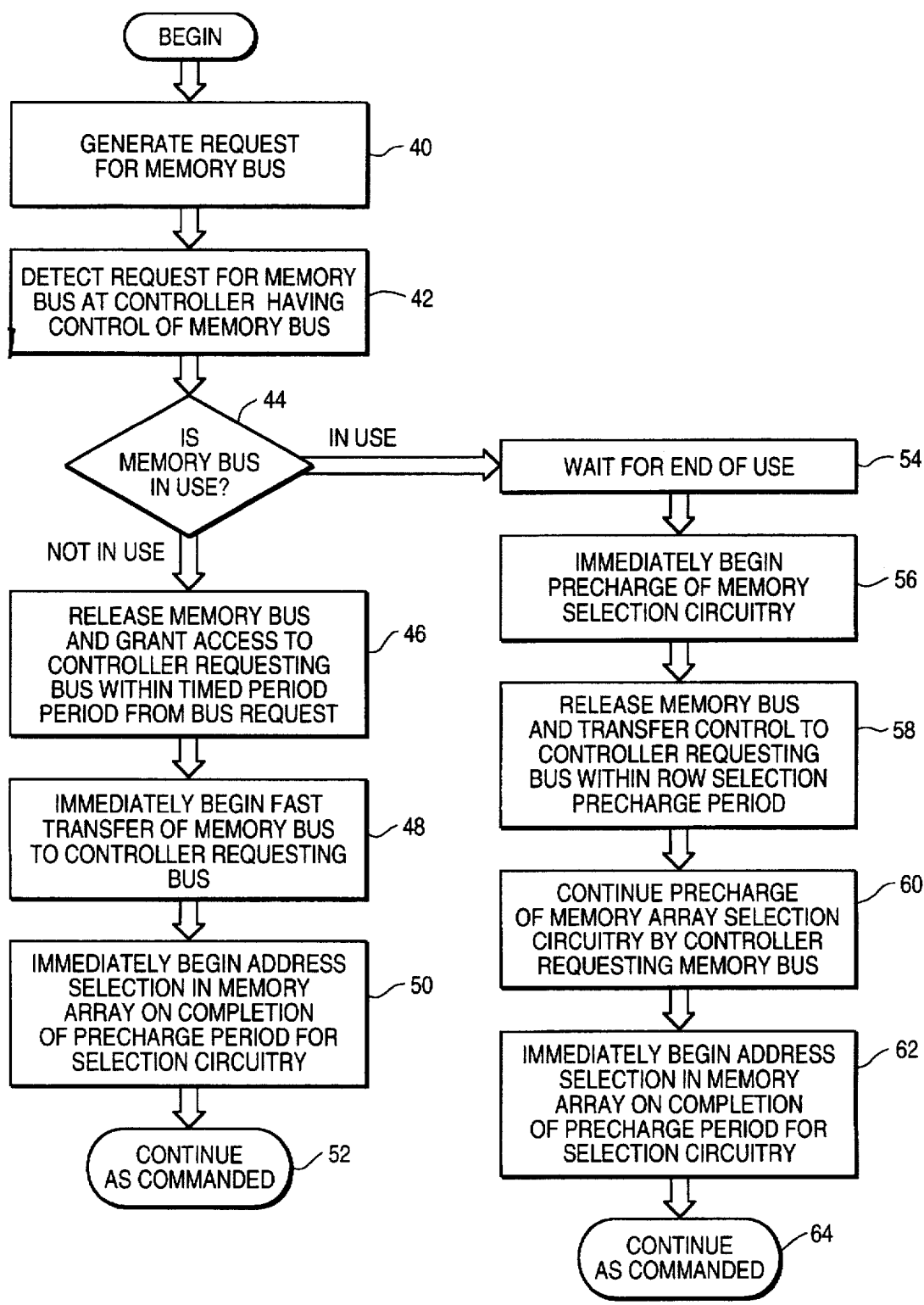
FIG_6

METHOD AND APPARATUS PROVIDING FAST ACCESS TO A SHARED RESOURCE ON A COMPUTER BUS

BACKGROUND OF THE INVENTION

1. Field of the Invention

This invention relates to personal computer systems and, more particularly, to methods and apparatus for increasing the speed at which a plurality of bus masters may arbitrate to gain rapid access to shared resources.

2. History of the Prior Art

As the capabilities of computer systems have increased, the amount of memory space utilized by those systems for storing data and programs has also increased. For example, a typical desktop computer using a single Intel Pentium® microprocessor may include sixteen megabytes of dynamic random access memory (DRAM) used as main memory, a gigabyte of electro-mechanical hard disk memory used for long term storage, one to four megabytes of DRAM or video random access memory (VRAM) used as part of a graphics frame buffer, and a number of other specialized memory arrays. It appears that both the amount and cost of the memory used by such a system will continue to increase in the future.

Historically, frame buffers have often utilized faster and more expensive memory devices (such as VRAM) while main memory have utilized slower DRAM. However, faster processors and improved system architecture have brought about substantial increases in the speed at which main memory may be operated. For example, it is now typical to position main memory on a separate memory bus with a memory controller controlling access to that bus. The increased speed at which main memory may be accessed and an increase in the average size of that memory has allowed a reduction in overall system cost by utilizing a portion of main memory to store and manipulate the graphics output.

In order to accomplish this, it is necessary that a graphics controller also be able to access main memory rapidly. A graphics controller has historically been used to implement the various manipulations (bit blit and the like) within a frame buffer array. When a portion of main memory is used to replace the frame buffer storage, such a graphics controller should be able to perform the same operations with graphics data in the assigned portion of main memory. In order to access main memory, any graphics controller (or other bus master) must gain access to the memory bus which is under the primary control of the memory controller. The need to switch control of access to main memory between the memory controller and other controllers or bus masters in the smallest possible time is therefore very important.

It is desirable to shorten the time required for a bus master in a personal computer system to gain access to a shared resource in a computer system having a plurality of bus masters or controllers and, more particularly, for a graphics controller to gain access to a main memory bus shared with a memory controller.

SUMMARY OF THE INVENTION

The present invention utilizes a new method and apparatus for accelerating transfers of control of access to a shared resource such as main memory between a plurality of controllers having access to a bus used by the resource. The method provides for detecting an access request by a bus controller, detecting whether the bus is being used by a controller, immediately commencing a timed bus transfer sequence if the bus is not in use, commencing a timed bus transfer sequence immediately when the bus use is over if the bus is in use, and releasing the bus and transferring control to the requesting controller immediately at the end of the timed bus transfer sequence.

These and other features of the invention will be better understood by reference to the detailed description which follows taken together with the drawings in which like elements are referred to by like designations throughout the several views.

BRIEF DESCRIPTION OF THE DRAWINGS

FIG. 3 is a block diagram illustrating one embodiment of circuitry of the present invention for increasing the Speed of accessing main memory on a memory bus by a local bus master.

FIG. 4 is a timing diagram illustrating an access of the memory bus by a local bus master when the memory bus is not in use.

FIG. 5 is a timing diagram illustrating an access of the memory bus by a local bus master when the memory bus is in use.

FIG. 6 is a flow chart indicating the steps of a method in accordance with the present invention.

Notation And Nomenclature

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

In this specification, a signal which includes a "#" in its name is considered to be an active low signal. The term "assert" as applied to a signal indicates that signal is active independent of whether the level of the signal is low or high. The term "de-assert" indicates that a signal is inactive.

DETAILED DESCRIPTION

Figure 1:
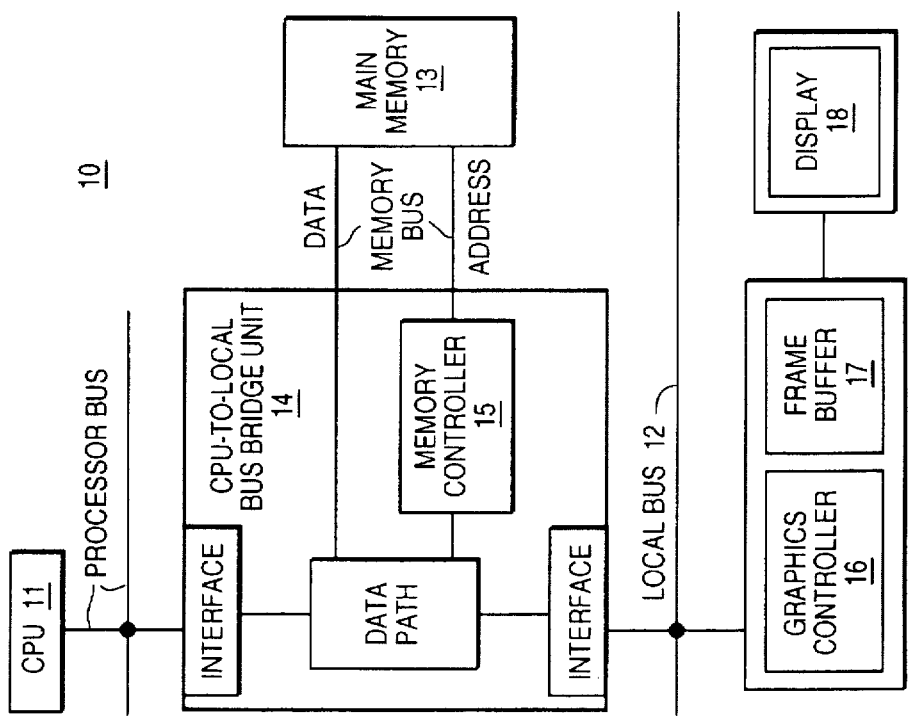
FIG. 1 is a block diagram of the architecture of a computer system designed in accordance with the prior art.

Referring now to FIG. 1, there is illustrated a typically prior art computer system 10. Although, the system 10 may be any computer system which functions in the general manner described, such systems are well represented by systems designed to utilize microprocessors, such as the Pentium® microprocessor, of a type designed and manufactured by Intel Corporation of Santa Clara, Calif. The system 10 illustrated includes a central processing unit 11 which executes the various instructions provided in the operation of the system 10. The central processing unit 11 is typically joined by a processor bus to a bridge circuit 14 which controls access to a local bus 12 adapted to carry information between the various components of the system 10. In FIG. 1, the bus 12 is preferably a peripheral component interface (PCI) bus or other high speed local bus adapted to provide especially fast transfers of data. In a typical system 10, various input/output devices are connected to the bus 12 as bus master and bus slave circuits. In the present illustration, for example, graphics controller 16 which controls a frame buffer 17 may be joined to the PCI bus 12 as a bus master or a bus slave. Other input/output devices such as sound boards, frame buffers, and the like may also be joined to the bus 12 in a similar manner.

The bridge circuit 14 is also joined by a memory bus to main memory 13. Main memory 13 is typically constructed of dynamic random access memory (DRAM) arranged in a manner well known to those skilled in the prior art to store information during a period in which power is provided to the system 10. Depending on the particular configuration, the bridge circuit 14 will typically include a secondary cache controller, a secondary cache (often referred to as a $L_2$ cache), a memory controller 15, and a number of buffers for storing data during its transfer between the processor, main memory, and the local bus. These components may be an integrated part of the bridge circuit 14 or, alternatively, be joined on a circuit board to the other components.

In the arrangement of FIG. 1, operations are conducted by the central processing unit 11 under control of an operating system which cooperates with application programs to transfer data to the various components of the system 10. Data addressed to main memory 13, for example, is transferred on the memory bus under control of the memory controller 15. Similarly, data read by the central processing unit 11 is transferred from main memory 13 on the memory bus under control of the memory controller 15. On the other hand, data being transferred to a frame buffer address controlled by the graphics controller 16 for storage in the frame buffer 17 and display on the output display 18 is transferred via a data path within the bridge circuit 14 to the bus 12. If that data is being transferred from the central processing unit 11, then the data and addresses are transferred by way of the bridge circuit to the bus 12. If that data is being transferred from main memory 13, the memory controller 15 controls the transfer from main memory to the bridge circuit 14 where it is placed in the bridge data path to the bus 12. Although the bridge circuit 14 typically owns control of the bus 12 in the absence of operations by other bus masters, there are times at which the bridge circuit 14 must arbitrate for the bus 12 and gain access to the bus 12 in order to place data on the bus 12 for transfer to the graphics controller 16.

It will be understood by those skilled in the art that if the frame buffer 17 is removed in the architecture of the system 10 and frame buffer operations are conducted in a portion of storage space in the main memory 13, then the graphics controller 16 must utilize the long path through the bus 12 and the memory controller 13 in order the manipulate and transfer data. In order to reduce this latency, an improved architecture has been designed to accelerate operations under control of a graphics controller when storage provided by the frame buffer 17 in the system of FIG. 1 is to be replaced by storage space in main memory.

Figure 2:
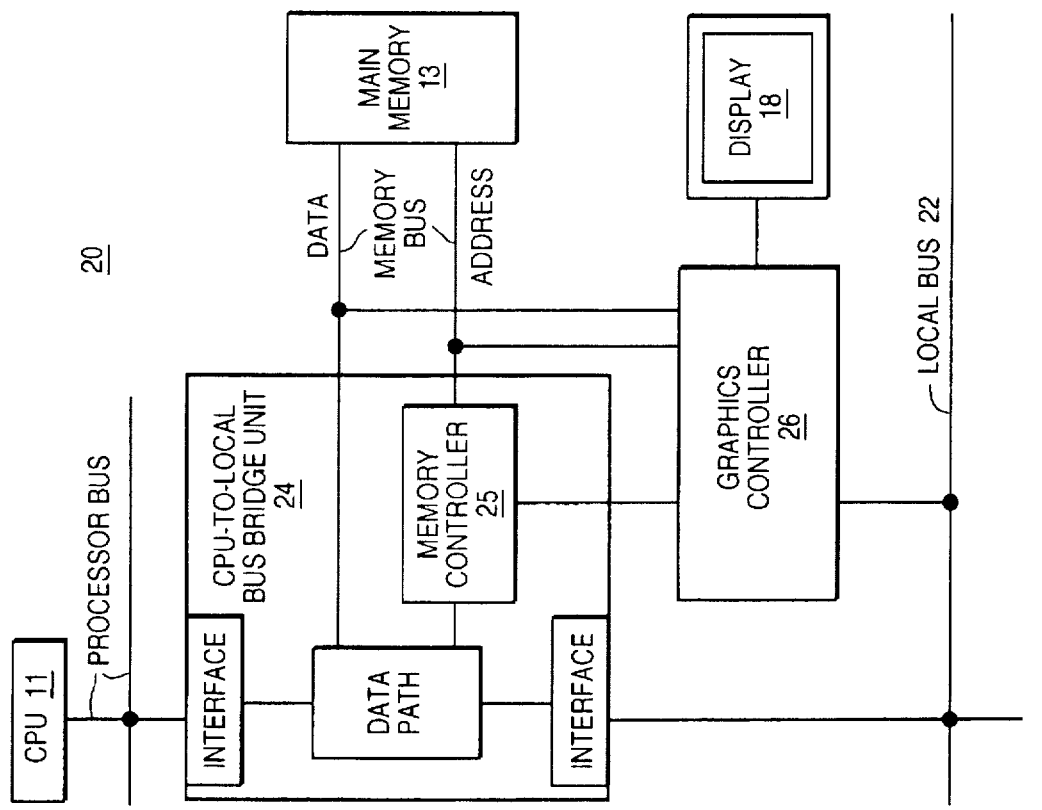
FIG. 2 is a block diagram of the architecture of a computer system designed in accordance with the present invention.

FIG. 2 illustrates an improved architecture designed to accelerate the operations under control of a graphics controller when storage for data to be displayed under control of a graphics controller is provided in main memory. As may be seen in the system 20 of FIG. 2, the system 20 illustrated includes a central processing unit 11 which is joined by a processor bus to a bridge circuit 24 which controls access to a high speed local bus 22 adapted to carry information between various components of the system 20. In a typical system 20, various input/output devices are connected to the bus 22 as bus master and bus slave circuits. In the present illustration, for example, graphics controller 26 which controls the manipulation and transfer of data to an output display 18 may be joined to the bus 22 as a bus master or slave. Other input/output devices such as sound boards, frame buffers, and the like may also be joined to the bus 22 in a similar manner.

The bridge circuit 24 is also joined by a memory bus to main memory 13. Main memory 13 may be constructed of DRAM, VRAM, or other random access memory arranged in a manner well known to those skilled in the prior art to store information during a period in which power is provided to the system 20. As in the system 10 of FIG. 1, the bridge circuit 24 may include a secondary cache controller; a secondary cache (often referred to as a $L_2$ cache); a memory controller 25; a number of buffers for storing data; and data and address paths for enabling the transfer of data and addresses between the processor, main memory, and the local bus. These components may be an integrated part of the bridge circuit 24 or, alternatively, be joined on a circuit board to the other components.

In contrast to the system 10, the graphics controller 26 of the system 20 is joined not only to the bus 22 but also to the memory bus. By these connections, the graphics controller 26 may control the transfer of data directly to itself and to the display 18 when it has access to the memory bus. With this access to main memory 13, the graphics controller 26 may store, read, and manipulate data within main memory 13 so that portions of main memory 13 may function in the manner of a frame buffer.

FIG. 3 is a more detailed block diagram of one embodiment of a portion of the circuitry illustrated in FIG. 2 for practicing the invention. In order to utilize a portion of main memory to replace the functions of a graphics frame buffer, it is necessary that a graphics controller have access to main memory to be able to practice the various manipulations necessary to the display of graphics. In FIG. 3 are shown the memory controller 25, the graphics controller 26, and main memory 13. The memory controller 25 is connected to receive and send information to the bus 12 and receives a clock input CLK. Similarly, the graphics controller 26 is connected to receive and send information to the bus 12 and receives a clock input CLK. Each of the memory controller 25 and the graphics controller 26 is connected to provide a plurality of control signals to main memory 13. These signals include a write enable signal WE#, a row access strobe RAS#, and a column access strobe CAS#. In addition, a memory address MADDR is driven on the memory address bus during access of memory. Data is transferred to and from main memory 13 on a memory data bus under control of these signals.

In general, when a controller has access to the memory bus and a memory operation is to occur, a valid memory address MADDR is driven on the bus; then the RAS# signal is asserted to allow selection of the proper row using the memory address followed by the assertion of one or more the GAS# signals to allow selection of an addressed column or columns.

In one system in which the invention may be utilized, the memory controller 25 has primary control of the memory bus so that whenever the memory bus is released, control reverts to the memory controller. In other systems, either of two or more controllers might retain control of the bus after completing a use until access were requested by another controller.

In the circuit of FIG. 3, assuming that the memory controller 25 has control of the memory bus, if the graphics controller 26 desires to conduct a memory operation, the graphics controller 26 asserts a memory bus request signal MREQ# indicating to the memory controller that the graphics controller desires access to the memory bus. If the memory controller 25 is not using the memory bus, the memory controller 25 responds by asserting a memory bus grant signal MGNT# to the graphics controller 26. This indicates to the graphics controller 26 that it has, control of the memory bus and may read or write on that bus. On the other hand, if the memory controller 25 is using the memory bus, the memory controller 25 completes its operation before releasing the bus to the graphics controller 26. The memory controller releases the memory bus by tristating the memory address lines, deasserting RAS# and CAS# signals, and asserting a memory bus grant signal MGNT# to the graphics controller 26.

A problem which occurs in allowing two controllers direct access to the memory bus is that some predetermined period is required for precharge of the row and column selection circuitry after the RAS# signal is deasserted by a controller handling over control of the bus to another controller. The precharge time will vary with the particular system since it depends on both the clock rate and the individual components within the DRAM memory array. In one system, this precharge time is three clock cycles. In other systems, other times precharge times are required. Since the precharge must occur before the row access strobe is asserted in order to assure correct row selection, it is necessary to provide at least this mount of time after the bus is released by one controller and asserted by the other controller. On the other hand, it is desirable to limit the amount of time for the precharge to occur to this known period so that no cycles are wasted in the transfer of control between controllers. The same problem arises with other transfers of control between bus controllers where predetermined operations must be completed before a transfer of bus control can occur.

The present invention provides the shortest possible transition time for transferring memory bus control from the memory controller 25 to the graphics controller 26 in either of two different situations which are possible when the graphics controller 26 requests access to main memory 13. The invention can also be utilized in other situations in which the transfer of memory bus control is not involved but in which predetermined operations must be completed before a transfer of bus control can occur. FIGS. 4 and 5 illustrate the timing of two different operations which occur in the particular embodiment of the invention. FIG. 4 illustrates the timing of operations when the memory controller has control of but is not using the memory bus, while FIG. 5 indicates the timing of operations when the memory controller is using the memory bus. FIG. 6 illustrates the steps involved in carrying out the invention.

In order to realize the shortest time for transfer of bus control, the memory controller 25 first determines the state of the RAS lines when the graphics controller 26 asserts the MREQ# signal (point "a" in each of FIGS. 4 and 5). The state of the RAS lines is determined by the memory controller 25 on the edge of the next clock at point "b." If the RAS signal is high as in FIG. 4 indicating that RAS# is not asserted by the memory controller 25, the transfer operation which takes place is a fast transfer operation; while, if the RAS signal is low as in FIG. 5 indicating that RAS# is asserted by the memory controller 25, the transfer operation is a slow operation.

If the RAS signal is low as in FIG. 5 indicating that RAS# is asserted by the memory controller 25, then nothing occurs until the memory controller 25 is ready to release the memory bus at the end of the operation being conducted. The end of the operation occurs in FIG. 5 during cycle 3. Since the memory controller 25 is aware that the end of the operation is occurring and that the MREQ# signal has been asserted by the graphics controller, the memory controller immediately does three things as soon as it completes the memory operation. The memory controller 25 drives the RAS lines high to deassert the RAS# signal and begin the RAS precharge (see point "e" in FIG. 5), tristates the memory address lines (see point "i" in FIG. 5), and asserts the memory bus grant signal MGNT# to the graphics controller 26. This indicates to the graphics controller 26 that it may assume control of the memory bus. One cycle later, the memory controller 25 tristates the RAS lines so that the graphics controller 26 may drive these lines.

In order to function as rapidly as possible, the graphics controller 26 includes a timing circuit 27 (or similar timing circuitry) which begins an interval when the graphics controller asserts the MREQ# signal. The timing circuit 27 senses the MGNT# signal when it is returned. If the MGNT# signal is returned within the next clock after the MREQ# signal is first asserted, then the graphics control may immediately assume control of the bus; and goes into a fast transfer operation to accomplish this. However, in FIG. 5, the MGNT# signal is not returned by the memory controller until the memory operation has been completed. When this occurs, the memory controller 25 drives the RAS lines high for one cycle and asserts the MGNT# signal at the clock edge (labeled point "c" in FIG. 5). Because the MGNT# signal was not sampled by the timing circuit within the preset time interval, the timing circuit 27 of graphics controller 26 places the transfer operation into a slow transfer operation. After driving the RAS lines for one clock, the memory controller 25 tristates the RAS lines (at point "f" in FIG. 5) which drift slightly lower but are held high by a pull up resistor (exemplified by resistor 28 in FIG. 3). In carrying out the slow transfer operation, in the next cycle after sensing the MGNT# signal, the graphics controller 26 drives the RAS lines high again (at point "g" in FIG. 5) before they can drift lower after being tristated by the memory controller. Simultaneously, the graphics controller 26 drives the memory address on the memory address lines (at point "j" in FIG. 5). Then, one cycle later, the graphics controller 26 asserts the RAS# signal (indicated by point "h" in FIG. 5) by driving the RAS lines low.

As may be noted in FIG. 5 which illustrates the slow transfer of the memory bus from the memory controller 25 to the graphics controller 26 which takes place when the memory controller is using the bus when MREQ# is asserted, the period from the end of the operation on the bus by the memory controller 25 (indicated by points "c" and "e" in FIG. 5) until the assertion of the RAS# signal by the graphics controller 26 (indicated by point "h" in FIG. 5) is just three cycles. With the exemplary circuitry, this is the shortest possible time for transition since the RAS precharge commences immediately at the end of the memory controller operation and continues for exactly the time required to precharge the RAS lines. Consequently, the invention provides the best possible time for transfer of control between the two controllers using the slow transfer sequence.

In the case illustrated in FIG. 4 in which the memory controller 25 has control of but is not using the memory bus when the MREQ# signal is asserted by the graphics controller 26, the memory controller 25 again determines the state of the RAS signal when the MREQ# signal is asserted by the graphics controller 26 (point "a" in FIGS. 4) by sensing the state of the RAS lines on the edge of the next clock at point "b." If the RAS signal is high (as in FIG. 4) indicating that the memory controller 25 is not conducting any operation on the memory bus and that charging of the RAS lines has continued for at least one cycle (at least by point "e" in FIG. 5), the memory controller 25 responds to the MREQ# signal by tristating the RAS lines (see point "f" in FIG. 5) which it has previously driven high, tristating the memory address lines (see point "i" in FIG. 5), and asserts the memory bus grant signal MGNT# to the graphics controller 26.

The MGNT# signal indicates to the graphics controller 26 that it may assume control of the memory bus. The graphics controller 26 senses the MGNT# signal at the next clock edge (see point "d" in FIG. 4) within the interval after the MREQ# assertion indicating a fast transfer operation. The timing circuit 27 detects that the receipt occurred within the preset interval and switches the graphics controller 26 to the fast transfer operation. In the fast transfer, immediately after sensing the MGNT# signal in the same clock cycle, the graphics controller 26 drives the RAS lines high (at point "g" in FIG. 4) so that RAS line charging continues. Simultaneously, the graphics controller 26 drives its memory address on the memory address lines (at point "j" in FIG. 4). Then, one cycle later, the graphics controller 26 asserts the RAS# signal (indicated by point "h" in FIG. 4) by driving the RAS lines low.

In FIG. 4 which illustrates the fast transfer of the memory bus from the memory controller 25 to the graphics controller 26 which takes place when the memory controller is not using the bus, it should be noted that the RAS lines are driven high and the memory address is asserted in the same cycle that the MGNT# signal is sensed. This allows, as with the slow transfer operation, the period from the end of the operation by the memory controller 25 (indicated as occurring at least by point "e" in FIG. 4) until the assertion of the RAS# signal by the graphics controller 26 (indicated by point "h" in FIG. 4) to be just three cycles. This is the shortest time possible to assure complete RAS line precharge since sensing the state of the RAS lines as high initiates the fast transfer sequence but does not indicate how long the lines have been high when sensed (the cross hatching preceding point "e" in FIG. 4 indicates that the lines might have gone high at any point); consequently, sufficient time must be provided for a full precharge of the RAS lines. With the exemplary circuitry, this is the shortest possible time for transition since the measurement of the RAS precharge time commences immediately at assertion of the MREQ# signal to the memory controller and continues for exactly the time required to precharge the P. AS lines. Consequently, the invention provides the best possible time for transfer of control between the two controllers.

Although the present invention has been described in terms of a preferred embodiment, it will be appreciated that various modifications and alterations might be made by those skilled in the art without departing from the spirit and scope of the invention. For example, the invention might be used in any situation in which two or more controllers, bus masters, processors, or the like share access to the same signals to main memory or some other memory array in a computer system. In a similar manner, other bus controllers on other buses often require some fixed period time in order to accomplish details related to the transfer of the bus from one controller to another and it is useful to provide the shortest possible transition time for transferring bus control from one controller to another controller. The invention should therefore be measured in terms of the claims which follow.

What is claimed is:

1. A method of transferring control of a memory bus, providing access to a memory array, from a controller having control of the memory bus to a controller desiring control of the memory bus, the method comprising the steps of:

detecting an access request generated by the controller desiring control, detecting whether the memory bus is being used, commencing a fast bus transfer sequence if the memory bus is not in use, the fast transfer sequence transferring control of the memory bus to the controller desiring control after a first time period, and commencing a slow bus transfer sequence, when the memory bus use is over, if the memory bus is in use, the slow transfer sequence transferring control to the controller desiring control after a second time period, which is longer than the first time period and which includes a precharge period not included in the first time period.

2. A method of transferring control of a memory bus according to claim 1 in which the step of detecting whether the memory bus is being used comprises sensing the state of a row address strobe line.

3. A method of transferring control of a memory bus according to claim 2 in which the fast bus transfer sequence comprises: tristating the row address strobe line by the controller having control of the memory bus, tristating memory address lines by the controller having control of the memory bus, generating a memory bus grant to the controller desiring control of the memory bus, responding to the memory bus grant by precharging the row address strobe line using the controller desiring control, driving a memory address on the memory address lines upon receipt of the memory bus grant, and asserting a row address strobe signal on the row address strobe line after the first time period.

4. A method of transferring control of a memory bus according to claim 2 in which the slow bus transfer sequence comprises:

driving the row address strobe line high to precharge row address selection circuitry in the memory array, generating a memory bus grant to the controller desiring control of the memory bus, tristating memory address lines by the controller having control of the memory bus, tristating the row address strobe line after a preselected delay by the controller having control of the memory bus after the end of a memory operation, the preselected delay providing the precharge period of the second time period not included in the first time period, responding to a memory bus grant by precharging the row address strobe line using the controller desiring control after the row address strobe line has been tristated, driving a memory address on memory address lines upon precharging of the row address strobe line using the controller desiring control, and asserting a row address strobe signal on the row address strobe line after the second time period.

5. A method of transferring control of a memory bus according to claim 2 in which the fast bus transfer sequence comprises:

tristating the row address strobe line by the controller having control of the memory bus, tristating memory address lines by the controller having control of the memory bus, generating a memory bus grant to the controller desiring control of the memory bus, responding to the memory bus grant by precharging the row address strobe line using the controller desiring control, driving a memory address on the memory address lines upon receipt of the memory bus grant, and asserting a row address strobe signal on the row address strobe line after the first time period; and in which the slow bus transfer sequence comprises:

driving the row address strobe line high to precharge row address selection circuitry in the memory array, generating a memory bus grant to the controller desiring control of the memory bus, tristating memory address lines by the controller having control of the memory bus, tristating the row address strobe line after a preselected delay, by the controller having control of the memory bus after the end of a memory operation, the preselected delay providing the precharge period of the second time period not included in the first time period, responding to a memory bus grant by precharging the row address strobe line using the controller desiring control after the row address strobe line has been tristated, driving a memory address on memory address lines upon precharging of the row address strobe line using the controller desiring control, and asserting a row address strobe signal on the row address strobe line after the second time period.

6. A method for accelerating transfer of control of access to a shared resource between a plurality of controllers having access to a bus used by the shared resource, the method comprising the steps of:

detecting an access request by a first bus controller, detecting whether the bus is being used by a second bus controller, commencing a fast bus transfer sequence if the bus is not in use by the second bus controller, the fast transfer sequence transferring control of the memory bus to the first bus controller after a first time period, and commencing a slow bus transfer sequence, when the bus use is over, if the bus is in use by the second bus controller, the slow transfer sequence transferring control to the first bus controller after a second time period, which is longer than the first time period and which includes a precharge period not included in the first time period.

7. A method for accelerating transfer of control of access to a shared resource as claimed in claim 6 in which the step of commencing a fast bus transfer sequence if the bus is not in use comprises the steps of:

releasing the bus, and transferring control to the first bus controller.

8. A method for accelerating transfer of control of access to a shared resource as claimed in claim 7 in which the step of transferring control to the first bus controller comprises the steps of:

asserting a bus grant signal to the first bus controller, and responding to the bus grant signal by commencing the fast transfer sequence by the first bus controller.

9. A method for accelerating transfer of control of access to a shared resource as claimed in claim 6 in which the step of commencing the slow bus transfer sequence comprises the steps of:

waiting for termination of bus use by the second bus controller, in response to termination of bus use by the second bus controller, precharging memory selection circuitry for a predetermined period before release of the bus, in response to termination of bus use by the second bus controller, asserting a bus grant signal and responding to the bus grant signal by commencing the slow transfer sequence by the first bus controller.

10. Apparatus for accelerating the transfer of control of access to a shared resource between a plurality of controllers having access to a bus used by the resource, the apparatus comprising:

a first circuit responsive to an access request by a first bus controller for detecting whether the bus is being used by a second bus controller, and a second circuit for selecting a fast bus transfer sequence if the bus is not in use by the second bus controller, and for selecting a slow bus transfer sequence, when the bus use is over, if the bus is in use by the second bus controller, wherein the fast transfer sequence transfers control of the memory bus to the first bus controller after a first time period, and wherein the slow transfer sequence transfers control to the first bus controller after a second time period, which is longer than the first time period and which includes a precharge period not included in the first time period.

11. Apparatus for accelerating the transfer of control as claimed in claim 10 in which the second circuit comprises a test circuit for measuring an interval beginning with a bus request and ending with a bus grant.

12. Apparatus for accelerating the transfer of control as claimed in claim 11 in which the fast bus transfer sequence and the slow bus transfer sequence each provide a period sufficient to charge row selection circuitry from the initiation of a bus request signal.

13. A computer system comprising:

a central processing unit a main memory array, a memory bus providing access to the main memory array, a first controller coupled to the main memory array by the memory bus, a second controller coupled to the memory array by the memory bus, signalling circuitry connecting the first controller and the second controller, and apparatus for accelerating the transfer of control of access to the memory array between the first and second controllers comprising:

a circuit responsive to an access request by the second controller for detecting whether the bus is being used by the first controller, and a circuit for selecting a fast bus transfer sequence if the bus is not in use and a slow bus transfer sequence, when the bus use is over, if the bus is in use, wherein the fast transfer sequence transfers control of the memory bus to the second controller after a first time period, and wherein the slow transfer sequence transfers control to the second controller after a second time period, which is longer than the first time period and which includes a precharge period not included in the first time period.

14. A computer system as claimed in claim 13 in which the circuit for selecting a fast bus transfer sequence comprises a test circuit for measuring an interval beginning with a bus request and ending with a bus grant.

15. A computer system as claimed in claim 14 in which the fast bus transfer sequence and the slow bus transfer sequence each provide a period sufficient to charge row selection circuitry from the initiation of a bus request signal.

16. A method of transferring control of a memory bus from a first controller to a second controller, the method comprising the steps of:

determining a request signal for control of the memory bus from the second controller;

determining whether memory selection circuitry has precharged for at least a predetermined time period prior to the request for control;

if the memory selection circuitry has not precharged for at least the predetermined time period, then initiating a first transfer sequence in which control of the memory bus is transferred to the second controller after a first time period so as to allow the memory selection circuitry to precharge for at least the predetermined time period; and if the memory selection circuitry has precharged for at least the predetermined time period, then initiating a second transfer sequence in which control of the memory bus is transferred to the second controller after a second time period, shorter than the first time period.

17. A method according to claim 16 wherein the step of determining comprises detecting whether the memory bus is being used by the first controller, and determining that the memory selection circuitry has not precharged for at least the predetermined time period if the memory bus is being used by the first controller.

18. A method according to claim 17 wherein the step of detecting whether the memory bus is being used by the first controller comprises detecting whether a row address strobe signal is asserted by the first controller.

19. A method according to claim 16 wherein the first transfer sequence is initiated after the use of the memory bus by the first controller has ended.

20. A method according to claim 16 wherein the second transfer sequence is initiated by the second controller, and the step of detecting comprises detecting whether the first controller issues a grant signal, in response to the request signal, within a predetermined response period.

21. Apparatus for transferring control of a memory bus from a first controller to second controller, the apparatus comprising:

a first circuit configured to detect assertion of a request signal for control of the memory bus by the second controller;

a second circuit configured to determine whether memory selection circuitry has precharged for at least a predetermined time period prior to the assertion of the request signal; and a third circuit configured, if the memory selection circuitry has not precharged for at least the predetermined time period, to initiate a first transfer sequence in which control of the memory bus is transferred to the second controller after a first time period so as to allow the memory selection circuitry to precharge for at least the predetermined time period, and, if the memory selection circuitry has precharged for at least the predetermined time period, to initiate a second transfer sequence in which control of the memory bus is transferred to the second controller after a second time period, shorter than the first time period.

22. Apparatus according to claim 21 where in the second circuit is configured to determine whether the memory selection circuitry has precharged for at least the predetermined time period by determining whether the memory bus is being used by the first controller.

23. Apparatus according to claim 22 wherein the second circuit is configured to determine whether the memory bus is being used by the first controller by detecting whether a row address strobe signal is asserted.

24. Apparatus according to claim 21 wherein the second circuit detects whether a grant signal is issued, in response to the assertion of the request signal, within a predetermined response period.

* * * * *

UNITED STATES PATENT AND TRADEMARK OFFICE
CERTIFICATE OF CORRECTION

| | | |
|---|---|---|
| PATENT NO. | : | 5,678,009 |
| DATED | : | October 14, 1997 |
| INVENTOR(S) | : | Bains et al. |

It is certified that error appears in the above-identified patent and that said Letters Patent is hereby corrected as shown below:

In column 5 at line 44 delete "mount" and insert --amount--

Signed and Sealed this

Nineteenth Day of May, 1998

Attest:

BRUCE LEHMAN

Attesting Officer

Commissioner of Patents and Trademarks